Figure 3:
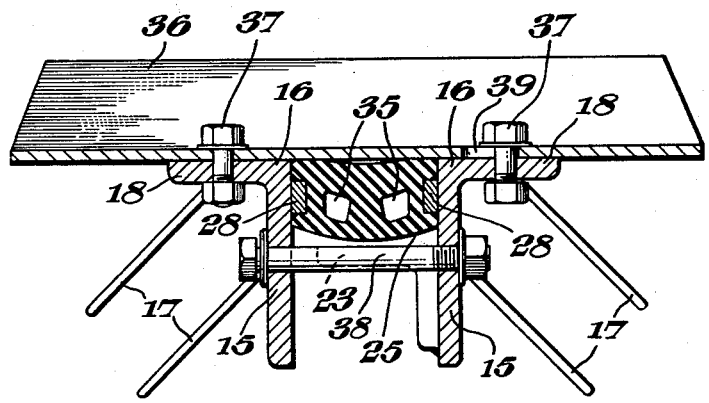

Jan. 19, 1965  A. J. HIRST ETAL  3,165,987
EXPANSION JOINTS
Filed June 11, 1962  2 Sheets-Sheet 1
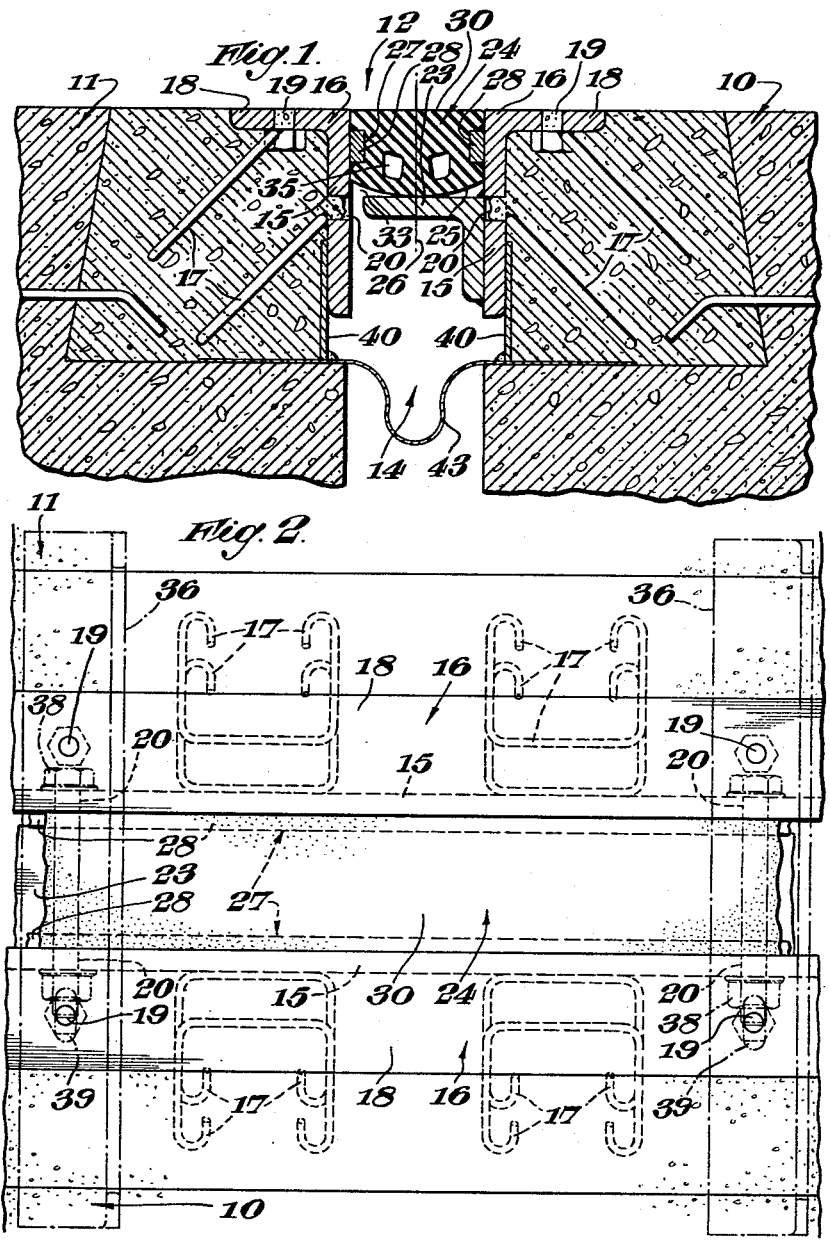

United States Patent Office 3,165,987
Patented Jan. 19, 1965

3,165,987
EXPANSION JOINTS
Archie John Hirst and Kazimierz Siwek, Leicester, and Terrence John Potterton, Glen Parva, Leicester, England, assignors to Metalastik Limited, Leicester, England, a British company
Filed June 11, 1962, Ser. No. 201,485
Claims priority, application Great Britain, Mar. 19, 1962, 10,459/62
5 Claims. (Cl. 94—18)

This invention relates to expansion joints for accommodating the expansion of a pair of surfacing members which may be, for example, adjacent concrete road sections or a road section joining with a bridge surfacing section, the joint bridging an expansion gap between the surfacing members.

An object of the present invention is to provide an expansion joint comprising a body of rubber, which term is taken to include both rubber and rubber-like materials, held always in a state of compression between the surfacing members so that the joint is sealed, the body of rubber having an upper surface which remains at least substantially in the plane of the upper surfaces of the surfacing members despite variations in the gap width due to change of temperature whereby the road surface remains acceptably flat.

Another object of the invention is so to shape the rubber body in cross-section that the body tends to buckle downwardly under the compressive forces acting upon it, and then to provide support means under the body and supporting the body against downward buckling.

In this way the support means can be made to maintain the upper surface of the body substantially in the plane of the upper surfaces of the surfacing members at least within the normal range of ambient temperature conditions, the flow of rubber of the rubber body necessary to accommodate narrowing of the expansion gap giving rise to a change of shape substantially only of the under surface of the rubber body.

Another object of the invention is to provide an expansion joint as just described in which the support means supports the rubber body in the mid-longitudinal plane of the body at all times within the normal range of ambient temperature conditions, the depth of the rubber body in the mid-longitudinal plane of the body remaining substantially constant, and the support means accommodating bulging of the under surface of the rubber body, upon expansion of the surfacing members, to each side of the mid-longitudinal plane of the body.

Another object is so to construct the expansion joint that the rubber body is merely lodged in position between a pair of metal plate members defining the expansion gap, the body being located in the vertical direction in the gap by inter-engaging formations on the rubber body and the plate members respectively.

In this way the use of an extruded rubber section to constitute the rubber body is made possible because no bonding of the rubber body is required. The rubber body may be bonded to the plate members if desired however.

Figure 4:
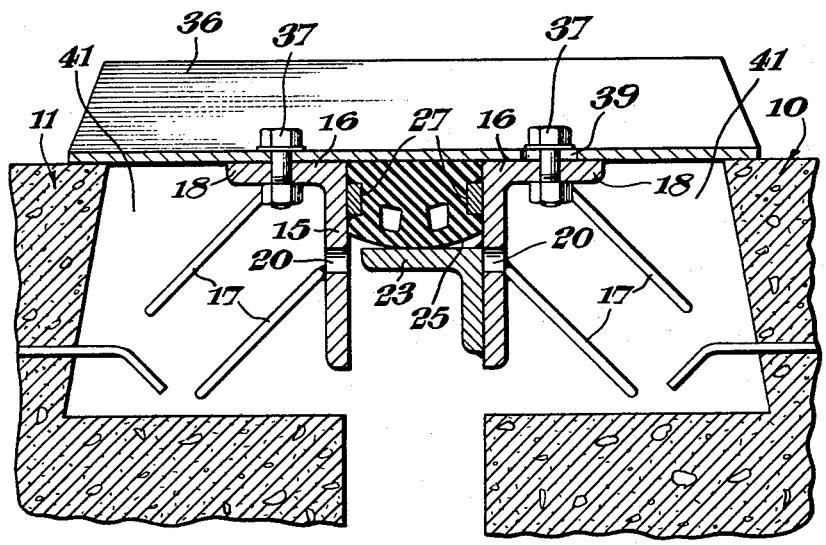

A specific embodiment of the present invention will now be described, merely by way of an example, with reference to the accompanying drawings in which:

FIG. 1 is a cross-section of an expansion joint according to the present invention, FIG. 2 is a plan view of the joint shown in FIG. 1, and including in chain-dotted outline parts used for assembling the joint in position between a pair of surfacing members, and FIGS. 3 and 4 show stages in the assembly of the joint between the surfacing members.

The drawings show the expansion joint, at a mean temperature condition, located between a pair of surfacing members which in the present example are respectively a concrete road surfacing section, indicated at 10, and an adjacent concrete bridge surfacing section, indicated at 11. The expansion joint, which is generally indicated at 12, is positioned between the sections 10 and 11, the joint bridging an expansion gap 14 for the bridge structure between the sections.

The joint comprises a pair of plate members 15, each constituted by one limb of an angle sectioned metal member 16 having welded thereto metal reinforcing rods 17 cast into the adjacent concrete surfacing members, thereby attaching the members 16 to the surfacing members with the plate members 15 lying in interfacing relationship one on each side of the expansion gap 14, the plate members 15 thereby defining the expansion gap.

The members 16 are cast into the adjacent surfacing members during assembly of the expansion joint, as will hereinafter be described, with their other flanges 18 lying flush with the general road surface to each side of the joint. The flanges 18 have bolt holes 19 for the purpose hereinafter described. Likewise the flanges 15 have aligning pairs of bolt holes 20 the purpose of which will also hereinafter be described.

The pairs of bolt holes 20 are provided spaced apart in the lengthwise direction of the joint as shown in FIG. 2. Between each adjacent pair of bolt holes there is provided, welded to one of the flanges 15, an angle-sectioned support member 23 upon which rests a rubber body 24. The rubber body 24 has a convex under surface 25 and is supported by the support member 23 in its mid-longitudinal plane 26 corresponding with the mid-longitudinal plane of the joint.

The body 24 has on each side a longitudinally extending rectangular sectioned groove 27 which receives a rectangular sectioned rod 28 welded to the adjacent flange 15. These inter-engaging formations 27, 28 locate the body 24 in the vertical direction.

The body 24 is held in a state of compression between the flanges 15 under all conditions within the normal range of ambient temperatures for which the expansion joint is designed.

The shape of the under surface 25 of the body 24, with its greatest depth in its mid-longitudinal plane 26, and the depth of the body in this plane is selected so that the centre of pressure of the rubber body under the compression forces lies sufficiently low down in the plane 26 for the body always to tend to buckle downwardly under the compressive forces acting upon it. The rubber body is supported against the downward buckling however by the support member 23 which is positioned to maintain the upper surface 30 of the body substantially in the plane of the surfaces of the surfacing members 10 and 11.

Due to its downward buckling tendency, further narrowing of the expansion gap 14 upon expansion of the surfacing members 10 and 11 is accommodated by the body 24 which under the greater compressive forces then acting upon its bulges downwardly on each side of its mid-longitudinal plane 26 i.e. into the spaces 33 and 34, and there is very little upward bulging of the surface 30 except under extreme conditions of compression due to the expansion gap being closed to near its maximum extent. To reduce the bulging of the surface 30 under extreme conditions, the surface 30 is slightly dished in its free state as shown in FIG. 3.

To reduce the compression stiffness of the body 24 in the width direction of the gap 14, and thereby ensure that the expansion joint does not transmit too large a force to the bridge section under maximum compression, the body is provided in the present example with longitudinally extending internal cavities 35 one to each side of its mid-longitudinal plane 26.

In some circumstances however these cavities may be omitted or replaced by a single cavity which is centrally placed of the rubber body section.

Where an internal cavity or cavities are provided these must be dimensioned and arranged so that the tendency for the rubber body to buckle downwardly under the compression forces is maintained, i.e. the centre of pressure must remain sufficiently low down.

The grooves 27 and the rods 28 may be dispensed with if required, the rubber body 24 being bonded to the metal members 16.

The surfacing members 10 and 11 are originally formed with rebates 41 which together constitute a trough to receive the expansion joint as shown in FIG. 4. To assemble the joint, use is made of clamping bars 36 indicated in FIGS. 2, 3 and 4. The clamping bars are formed by angle-sectioned members, a number of which are provided, spaced apart in the lengthwise direction of the joint, each bridging the joint and being bolted to the members 16 of the joint by bolts indicated at 37 in FIGS. 2, 3 and 4. One of the bolt holes 39 for the bolts 37 in the clamping bars 36 is of elongated form so as to allow the members 16 to be drawn towards one another by means of further bolts 38 entered through the aligning pairs of bolt holes 20 previously described.

The bolts 38 are drawn up to compress the rubber body 24 to an extent depending upon the ambient temperature at which the expansion joint is installed. The bolts 37 are then tightened so as to hold the rubber body in compression between the members 16 and the bolts 38 are removed.

The expansion joint is then lowered into the trough the clamping bars 36 bridging the trough and supporting the joint in its correct position as shown in FIG. 4. Suitable shuttering plates 30 are then inserted, together with a copper strip 43 to seal off the lower side of the gap 14, and the space around the joint is then filled with concrete thereby to cast the joint into position. Finally the clamping bars 36 are removed and the bolt holes in the flanges 18 filled with concrete or any other suitable filling material. The copper strip may be omitted if desired.

The free width of the rubber body in the joint now being described by way of example is 3¼″. The maximum compression of the joint is three-quarters of an inch from the free condition of the joint allowing for a minimum of one-eighth of an inch compression under the widest gap dimensioned within the designed ambient temperature range.

This allows for a contraction and expansion of the joint of plus or minus five sixteenths of an inch and is therefore suitable for bridge structures with a free length up to about 150 feet depending upon the materials used in the bridge structure and the ambient temperature range.

Due to the compression which is always maintained in the rubber body 24, the joint effectively seals the gap in the road surface under all conditions including the widest gap dimension, and without vertical load on the rubber body due to traffic. The joint therefore prevents water seeping through the road surface into the expansion gap. The joint does not necessarily have to be assembled exactly at right angles to the direction of the thermal movement which it is to accommodate since it will permit small relative longitudinal movements between the members 16 the rubber body then being deflected in shear. This is of advantage since it means that the joint may be used with a bridge which is set with skew in relation to its approach road.

The joint as described is intended for relatively short bridge structures as indicated and is of a simple design and cheap to produce. Since there is no direct metal connection between the two halves of the joint, the joint will accept relative movements between the two halves in the vertical plane. Thus, for example, a small settlement of the bridge structure in relation to the approaching road surface will not damage the joint.

The rubber body 24 and the main metal angle members 16 may be of any convenient length. If the joint is to comprise lengthwise sections for convenience in manufacture the angle members 16 of the sections are welded end to end on the site, and if the road surface is cambered the camber is accommodated in the weld connections. Alternatively the metal members 16, the rods 28 and the support member 23 may be bowed to follow the camber of the road and either welded up from shorter lengths or made each in one lengthwise piece.

We claim:

1. An expansion joint accommodating the expansion of a pair of surfacing members, the joint comprising a body of rubber confined between and bridging, in load carrying manner, an expansion gap between the surfacing members, the width of the expansion gap being always less than the unconfined width of said body of rubber whereby the body of rubber is held always in a state of compression between the surfacing members, said body having a substantially plane upper surface and a transversely convex undersurface so as to present a thickness in its mid-longitudinal plane between the surfacing members which is substantially greater than its thickness in regions adjacent its longitudinal edges whereby the body tends always to buckle downwardly under the action of the compression forces exerted upon it by the surfacing members, and support means carried from one of the surfacing members and extending beneath the rubber body across the expansion gap towards the other of the surfacing members, the support means presenting a flat upwardly directed support surface lying tangentially in engagement with the convex undersurface of the rubber body and supporting the body against its downward buckling tendency at all times within the range of normal ambient temperature conditions to be encountered, with the upper surface of the body lying substantially in the plane of the upper surfaces of the surfacing members, the support convex undersurface of the rubber body lying clear of the support surface on each side of the mid-longitudinal plane of the body so as to define therewith a space, said spaces accommodating downward bulging of the undersurface of the rubber body upon expansion of the surfacing members.

2. An expansion joint as claimed in claim 1, wherein the rubber body is an extruded section having at least one longitudinally extending internal cavity to reduce its compression stiffness in the width direction of the expansion gap.

3. An expansion joint accommodating the expansion of a pair of surfacing members, the joint comprising a body of rubber confined between and bridging in load carrying manner an expansion gap formed between metal plate members carried respectively by the surfacing members, the width of the gap between the metal plate members being always less than the unconfined width of said body of rubber whereby the rubber body is held always in a state of compression between the metal plate members, the rubber body being separate of the plate members and having a substantially plane upper surface and a thickness in its mid-longitudinal plane which is substantially greater than its thickness in regions adjacent its longitudinal edges, whereby the body tends always to buckle downwardly under the action of the compression forces exerted upon it by the plate members, the longitudinal edges of the rubber body being supported vertically by inter-engaging formations on the body and the plate members respectively under all conditions of the joint and the joint further comprising a support means carried by one of the plate members and extending beneath the rubber body across the expansion gap towards the other plate member, the support means presenting a flat upwardly directed support surface lying tangentially in engagement with the undersurface of the rubber body in the region of the mid-longitudinal plane of the body to support the body against its downward buckling tendency at all times within the range of normal ambient temperature conditions to be encountered, with the upper surface of the body lying substantially in the plane of the upper surfaces of the surfacing members, the undersurface of the rubber body on each side of, and in the supported region thereof lying clear of the support means part bounding a space, said spaces accommodating downward bulging of the undersurface of the rubber body upon expansion of the surfacing members.

4. An expansion joint accommodating the expansion of a pair of surfacing members, the joint comprising a body of rubber confined between and bridging in load carrying manner an expansion gap formed between metal plate members carried respectively by the surfacing members, the width of the gap between the metal plate members being always less than the unconfined width of said body of rubber whereby the rubber body is held always in a state of compression between the metal plate members, the rubber body being bonded to the plate members and having a substantially plane upper surface and a thickness in its mid-longitudinal plane which is substantially greater than its thicknes in regions adjacent its longitudinal edges, whereby the body tends always to buckle downwardly under the action of the compression forces exerted upon it by the plate members, and a support means carried by one of the plate members and extending beneath the rubber body across the expansion gap towards the other of said plate members, the support means presenting a flat upwardly directed support surface lying tangentially in engagement with the undersurface of the rubber body in the region of the mid-longitudinal plane of the body to support the body against its downward buckling tendency at all times within the range of normal ambient temperature conditions to be encountered, with the upper surface of the body lying substantially in the plane of the upper surfaces of the surfacing members, the undersurface of the rubber body on each side of the supported region thereof lying clear of the support means and in part bounding a space, said spaces accommodating downward bulging of the undersurface of the rubber body upon expansion of the surfacing members.

5. An expansion joint accommodating the expansion of a pair of surfacing members, the joint comprising a body of rubber confined between and bridging, in load carrying manner, an expansion gap formed between depending flanges of a pair of metal angle sectioned members cast respectively into the surfacing members, the width of the gap between said flanges being always less than the unconfined width of said body of rubber whereby the rubber body is held always in a state of compression between said depending flanges, the body of rubber being formed as an extruded section having a substantially plane upper surface and a transversely convex undersurface so as to present a thickness in its mid-longitudinal plane which is substantially greater than its thickness in regions adjacent in longitudinal edges, whereby the body tends always to buckle downwardly under the action of the compression forces exerted upon it by the depending flanges of the angle sectioned members, the longitudinal edges of the rubber body being supported vertically by inter-engaging formations on the body and the depending flanges of the angle sectioned members respectively under all conditions of the joint, the joint further comprising a further metal angle sectioned member connected with one flange flat against the depending flange of one of the first said angle sectioned members and with the other flange extending beneath the rubber body across the expansion gap towards the depending flange of the other of said first said angle sectioned members, said other flange presenting a flat upwardly directed support surface lying tangentially in engagement with the convex undersurface of the body and supporting the rubber body against its downward buckling tendency at all times within the range of normal ambient temperature conditions to be encountered with the upper surface of the body lying substantially in the plane of the upper surfaces of the surfacing members, the convex undersurface of the rubber body lying clear of the support surface on each side of the mid-longitudinal plane of the body so as to define therewith a space, said spaces accommodating downward bulging of the undersurface of the rubber body upon expansion of the surfacing members.

References Cited in the file of this patent

UNITED STATES PATENTS

| | | |
|---|---|---|
| 2,210,138 | Bishop | Aug. 6, 1940 |
| 2,240,787 | Kinzer | May 6, 1941 |
| 2,269,449 | Fischer | Jan. 13, 1942 |
| 2,575,247 | Carter | Nov. 13, 1951 |
| 2,976,782 | Thom | Mar. 28, 1961 |
| 3,068,763 | Harza | Dec. 18, 1962 |
| 3,097,579 | Fujihara | July 16, 1963 |